US005487835A

United States Patent [19]
Shane

[11] Patent Number: 5,487,835
[45] Date of Patent: Jan. 30, 1996

[54] PRESSURIZED SOLUTION FEED SYSTEM FOR PH CONTROL

[75] Inventor: Tommy J. Shane, Loganville, Ga.

[73] Assignee: Tomco$_2$ Equipment Co., Loganville, Ga.

[21] Appl. No.: 182,766

[22] Filed: Jan. 14, 1994

[51] Int. Cl.$^6$ .................................................. C02F 1/66
[52] U.S. Cl. .......................... 210/74.9; 210/724; 210/928
[58] Field of Search ..................................... 210/696, 702, 210/703–706, 709, 716, 724, 743, 749, 758, 928; 423/437

[56] References Cited

U.S. PATENT DOCUMENTS

| | | | |
|---|---|---|---|
| 369,288 | 8/1887 | Hyatt | 210/716 |
| 3,446,488 | 5/1969 | Mail et al. | 210/705 |
| 3,926,588 | 12/1975 | Speece | 210/758 |
| 4,108,768 | 8/1978 | Sebelik et al. | 210/705 |
| 4,156,650 | 5/1979 | Garrett | 210/758 |
| 4,216,085 | 8/1980 | Chittenden | 210/703 |
| 4,340,489 | 7/1982 | Adams | 210/758 |
| 4,492,636 | 1/1985 | Burke | 210/705 |

OTHER PUBLICATIONS

Robert B. Williams and Gordon L. Culp, "Handbook of Public Water Systems", pp. 676–692, New York 1986.
Robert L. Sanks, "Water Treatment Plant Design", pp. 567–596, Ann Arbor, Michigan, 1978.
"Introduction to Water Treatment", vol. 2, pp. 115–166 and 253–278, Colorado, 1984.
Merrill L. Riehl, "Hoover's Water Supply and Treatment", pp. 103–145, Washington, D.C., 1976.
John F. Dye and J. L. Tuepka, Water Quality and Treatment Handbook, "Chemistry of the Lime–Soda Process", pp. 313–340, McGraw–Hill Book Company, 1971.
Water Treatment Plant Design, Chapter 11, "Lime–Soda Ash Softening", pp. 209–226, New York, N.Y. 1969.

Primary Examiner—Peter A. Hruskoci
Attorney, Agent, or Firm—Deveau, Colton & Marquis

[57] ABSTRACT

A method and apparatus for controlling the pH of a water stream using carbon dioxide, in which carbon dioxide at a selected pressure and flow rate is mixed with a carrier water, also at a selected pressure and flow rate, and the carbon dioxide-carrier water mixture is injected into the water stream, which is at a lower pressure, thus allowing the carbon dioxide to come out of the solution, contact the water stream and correspondingly adjust the pH of the water stream.

7 Claims, 4 Drawing Sheets

PRESSURIZED SOLUTION FEED SYSTEM FOR PH CONTROL

BACKGROUND OF THE INVENTION

1. Technical Field

This invention relates generally to the field of treating potable or waste water so as to reduce the pH of the water, and relates more specifically to a method and apparatus for injecting carbon dioxide into potable or waste water having a high pH level so as to reduce the pH of the water.

2. Prior Art

During its treatment phase, potable or waste water may have a high pH level, high being any pH over a pH of 9. Such a pH is unacceptable for a final, treated water product and this pH must be reduced prior to allowing the treated water into general use. For example, most water treatment plants are required to maintain an effluent pH of between 6 and 9. Therefore, any water being treated having a pH of higher than about 9 should have its pH lowered before leaving the plant.

One method for treating water so as to lower its pH is to inject carbon dioxide gas into the water. Several methods currently are used to inject the carbon dioxide into the water. The most accepted method is to inject the carbon dioxide into the water by a direct gas feed through some type of diffusion system in a recarbonation basin; in effect, a bubbler. A mechanical mixing means can be used in combination with this method for better efficiency. Another method for injecting carbon dioxide into water is to aspirate the carbon dioxide into a stream of water using a venturi type eductor. In this method, the carbon dioxide is injected into the stream of water and carried along with the stream of water to a grid system located in a basin or a pipeline.

Both the direct gas feed method and the venturi method of injecting carbon dioxide gas into water allow for the control of the pH and the stabilization of the treated water. However, it is difficult to control the efficiency of the carbon dioxide gas usage. Both of these processes require the use of a relatively large contact basin, a relatively long contact time or large amount of carrier water, all of which inherently are inefficient. Therefore, the need exists for a system for injecting carbon dioxide into water to control the pH of the water which has a greater efficiency per unit of carbon dioxide used using either less carbon dioxide or less components. A direct carbon dioxide injection method and apparatus in which the amount of carbon dioxide injected into the water stream is controlled, and the elimination of the recarbonation basin would satisfy this need, and result in increased efficiency and lower cost. It is to this need that the present invention is directed.

BRIEF SUMMARY OF THE INVENTION

The present invention takes carbon dioxide gas at an elevated pressure and injects this gas into carrier water, also at an elevated pressure. The carrier water-carbon dioxide solution, still at an elevated pressure, then is injected into the water to be treated, which typically is at atmospheric pressure, through a unique diffuser system. As the pressurized carrier water-carbon dioxide solution is injected into the water to be treated, the carbon dioxide expands due to the lower pressure of the water to be treated and the excess carbon dioxide bursts forth out of solution as minute bubbles released into the main stream of water. The carbon dioxide bubbles mix rapidly with the main stream of water, thus reducing the pH of the main stream of water. In most cases, 95% of the chemical reaction between the main stream of water and the carbon dioxide gas is immediate, thus eliminating the need for a recarbonation basin or an extended contact area or contact time.

The apparatus comprises means for injecting the elevated pressure carbon dioxide gas into the elevated pressure carrier water. The carrier water-carbon dioxide solution then passes through in-line static mixing means for further mixing. After the static mixing means, a serpentine pipe system means is provided, allowing additional contact time between the injected carbon dioxide and the carrier water stream. The carrier water-carbon dioxide solution then is injected into the main water stream through a diffuser. This diffuser is designed to maintain system pressure, thus forcing the $CO_2$ gas to remain in the carrier water solution. The super saturated water-$CO_2$ solution mixture then passes through the diffuser into the main stream of water. At this moment, excess $CO_2$ gas is released as an effervescence, immediately being absorbed in the main stream water. The diffuser is also designed to enhance mixing of the two solutions.

The preferred solution injector is triangular, prismatic, and preferrably somewhat concave on two sides, and is inserted normal to the direction of flow of the water stream. One triangular end of the diffuser connects to an inlet feed-line for the saturated solution, while the second triangular end is solid. Two of the rectangular sides of the diffuser have a plurality of small holes therethrough allowing communication between the interior of the diffuser and the water stream. The vertex of two sides faces upstream and the third side faces downstream relative to the direction of flow of the water.

The saturated solution of elevated pressure is fed to the diffuser through a feed-line. The pressurized solution, upon encountering the lower pressure water stream, equilibrates. At this precise moment, the excess $CO_2$ gas in the carrier water bursts forth in the form of minute $CO_2$ gas bubbles.

As the vertex of the two sides of the diffuser faces upstream, two sides of the diffuser effectively are in the flow path of the water stream. This, along with the velocity at which the saturated carrier water solution exits the diffuser assembly, allows for effective mixing and greater contact time between the lower pH carrier water, expanded $CO_2$ gas and the main water stream. The positioning of the third side of the diffuser, facing downstream, creates a vortex in the main water stream flow, thus allowing additional mixing.

Accordingly, it is an object of the present invention to provide a solution feed system for injecting carbon dioxide into a water stream for controlling the pH of the water stream.

It is another object of the present invention to provide a solution feed system in which recarbonation basins and/or extended contact areas or times are unnecessary.

Another object of the present invention is to provide a solution feed system in which elevated pressure carbon dioxide first is mixed with elevated pressure carrier water, and the elevated pressure carrier water-carbon dioxide solution then is injected into the water to be treated.

Still another object of the present invention is to provide a solution feed system in which carbon dioxide mixes almost immediately with the water to be treated, thus reducing the overall contact time needed between the carbon dioxide and the water to be treated.

It is yet a further object of the present invention to provide a solution feed system which can be operated continuously and eliminates the need for a batch treatment apparatus.

Another object of the present invention is to provide a solution feed system for controlling the pH of a water stream which is efficient in operation, simple in construction and manufacture, and easy to operate.

These objects, and other objects, features and advantages of the present invention, are described in the following Detailed Description of a Preferred Embodiment and the appended figures, in which like reference characters represent like parts throughout the several views.

DETAILED DESCRIPTION OF A PREFERRED EMBODIMENT

Figure 1:
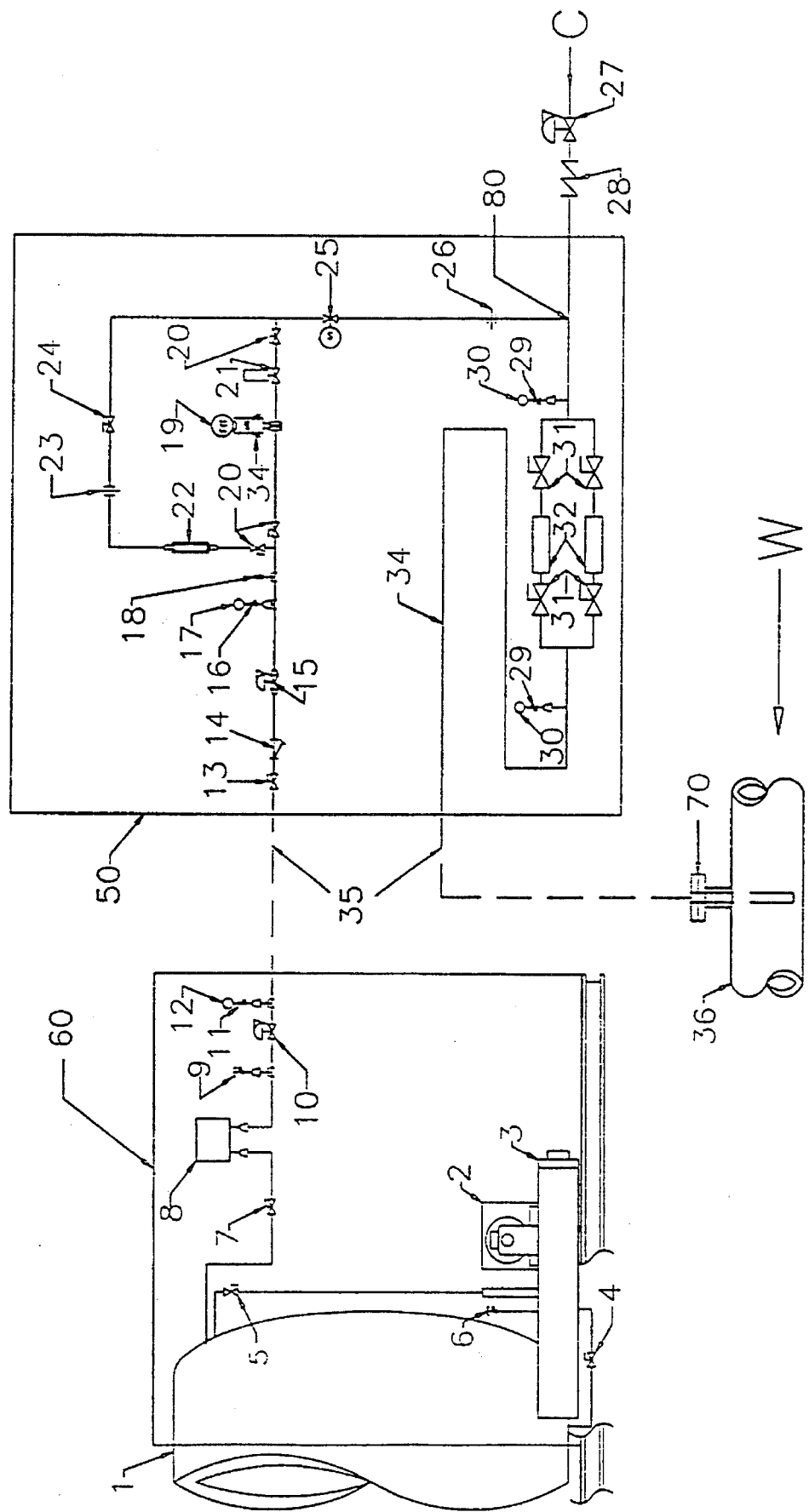
FIG. 1 is a schematic of the entire solution feed system of the present invention.

Referring now to FIG. 1, a general schematic of the entire solution feed system is shown. In general, the solution feed system comprises a carrier water-carbon dioxide solution creation means 50, also called the control panel and shown in greater detail in FIG. 2, a carbon dioxide supply means 60, and an injector means 70. The various components 50, 60, 70 are connected using standard piping 35.

The carbon dioxide supply means 60 comprises a liquid carbon dioxide storage tank 1 in which liquid carbon dioxide is stored until needed. The liquid carbon dioxide is kept at a temperature cool enough to remain liquid by refrigeration unit 2. Vaporizer liquid isolation valve 4 allows liquid carbon dioxide to be admitted to a carbon dioxide vaporizer 3 to vaporize the carbon dioxide. Vaporizer vapor isolation valve 5 allows the vaporized carbon dioxide to be admitted to the top of the liquid carbon dioxide storage tank 1.

When running the solution feed system of the present invention, vaporized carbon dioxide from liquid carbon dioxide storage tank 1 is admitted to a carbon dioxide vapor heater 8 through vapor process isolation valve 7. Within the carbon dioxide vapor heater 8, the vaporized carbon dioxide is heated to an appropriate temperature. A primary pressure regulator 10 maintains the carbon dioxide at the desired pressure before the carbon dioxide is admitted to the carrier water-carbon dioxide solution creation means or control panel 50. A line pressure relief valve 9 is included in the pressure regulator line for safety purposes. A pressure gauge 12, separated from the pressure regulator line by gauge isolation valve 11, allows visual checking of the pressure of the carbon dioxide vapor. The carbon dioxide then travels through piping 35 to carrier water-carbon dioxide solution creation means or control panel 50.

The carrier water-carbon dioxide creation means or control panel 50 comprises the components for creating the desired solution of carbon dioxide gas in carrier water. The carbon dioxide is admitted to the control panel 50 through control panel isolation valve 13. The carbon dioxide then is strained in carbon dioxide strainer 14 to remove any debris, and is maintained or brought to the proper desired pressure using secondary pressure regulator 15. A pressure gauge 17, separated from the carbon dioxide feed line by gauge isolation valve 16, allows visual checking of the pressure of the carbon dioxide. A line safety release valve 18 is placed on the feed line for safety purposes. At this point, the feed of the carbon dioxide is diverted to one of two lines: either the automatic flow control line comprising automatic control valve 21, or the manual flow control line, comprising manual VAREA-meter 22.

The preferred path is the automatic flow control line which allows automatic flow control of the carbon dioxide feed. The carbon dioxide is admitted to the automatic flow control line via an isolation valve 20. The flow is regulated using an automatic flow control valve 21, which previously has been set at the desired flow rate, and/or which can be adjusted continuously based on the pH of the treated water, as discussed in more detail below. Any typical automatic flow control valve can be used and in the present example, a Badger Controls one-half inch 807 S.S. valve with "E" trim connected with an EVA-1 actuator is used. The carbon dioxide flow is measured by a flow indicator/transmitter 19. Any suitable flow indicator/transmitter can be used, and in this example, a Foxboro 823DP flow indicator/transmitter is used. The carbon dioxide flow then continues through a second isolation valve 20.

Alternatively, the carbon dioxide flow can be manually maintained. The automatic flow control line is closed off using an isolation valve 20 while a second isolation valve 20 allows the carbon dioxide feed to enter the manual flow control feed line. The carbon dioxide passes through a VAREA-meter 22 to measure its flow rate. Although any VAREA-meter or other gas flow measurement meter can be used, a Wallace & Tiernan 5210B12208BB406SX VAREA-meter is used in this example. The flow through the manual flow control line is regulated using a manual flow control valve 24. Typically, a one-half inch needle valve is employed. Prior to encountering the manual flow control valve 24, the carbon dioxide is sent through a one-half inch orifice union. The carbon dioxide then continues along the feed path.

After exiting either the automatic flow control line or the manual flow control line, the carbon dioxide is mixed with carrier water C to obtain a carrier water feed solution or mixture having an excess of carbon dioxide gas. The carrier water C is supplied to the control panel 50 under pressure through a water pressure/flow regulator 27. The pressurized carrier water C is prevented from back flowing into the carrier water C feed line by a water back flow preventor 28. The carbon dioxide feed, also under pressure, is injected into the pressurized carrier water C through an injector 80.

Typically, a ratio of approximately 60 gallons of carrier water C per pound of carbon dioxide gas is used and preferred. The carrier water C is pressurized to a minimum of 50 psig. The carbon dioxide typically is supplied to the carrier water C at between 60 and 75 psig. In general, the present invention is designed to allow flow rates of carbon dioxide of from about 5 to 2000 pounds per hour. However, carbon dioxide can be supplied to the carrier water C at a pressure of anywhere between about 30 and 300 psig, and a flow rate of anywhere between about 5 and 5000 pounds per hour. The system is designed to handle flow rates of carrier water C of approximately 100 gallons per minute at 50 psig, but can be altered to handle flow rates of carrier water C of anywhere between about 25 and 2000 gallons per minute at a pressure of anywhere between about 50 and 150 psig.

After the carbon dioxide has been injected into the carrier water C, the carbon dioxide laden carrier water is subjected to mixing operations to achieve a better uniformity of the carbon dioxide in solution in the carrier water C. The carbon dioxide laden carrier water first flows through a static mixer 32 for initial mixing of the carrier water-carbon dioxide solution. The static mixer 32 typically is isolated from the flow line by ball valves 31. In the preferred embodiment shown in FIGS. 1 and 2, parallel static mixers 32 are used, either of which can be used separately or in combination with each other. The pressure of the carrier water-carbon dioxide water solution is measured at various points along the flow line by pressure gauges 30 separated from the flow line by gauge isolation valves 29. After leaving the static mixer 32, the carrier water-carbon dioxide solution flows along a serpentine pipe system 34 to allow additional mixing and retention time.

Figure 2:
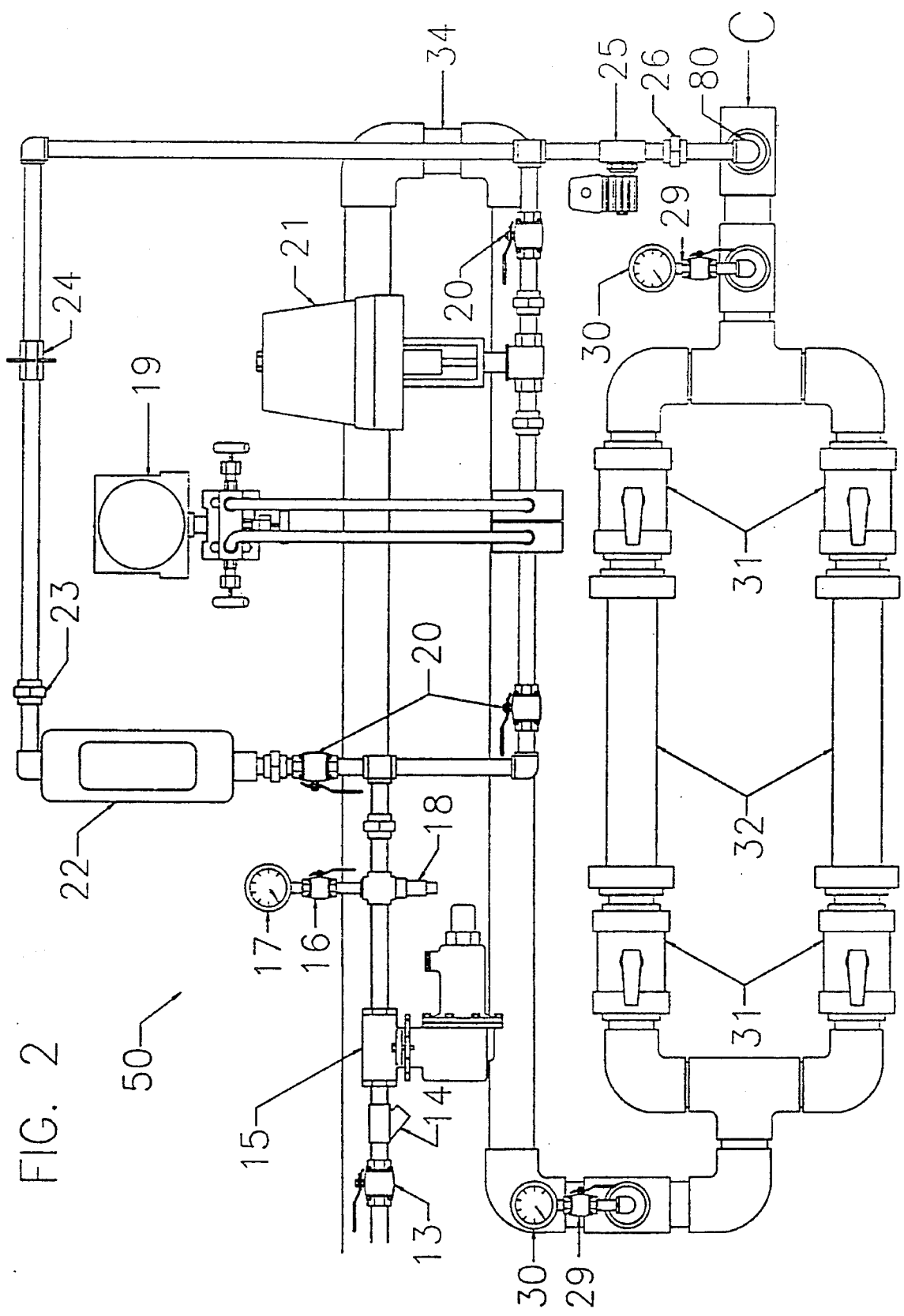
FIG. 2 is a side view of the injection apparatus of the present invention.

An isometric detail view of a typical control panel 50 is shown in FIG. 2. These components can be configured as shown in FIG. 2 so as to result in a stand alone control panel 50 ready for use in a turn-key operation.

The carrier water-carbon dioxide solution exits the control panel 50 and is supplied to the diffusion means 70 through piping 35. Diffusion means 70 is inserted into pipe 36 which carries the water W to be treated. As discussed in more detail below, the water W to be treated travels through pipe 36 and past the diffusion means 70, which allows the carrier water-carbon dioxide solution to diffuse into the water W to be treated.

Figure 3:
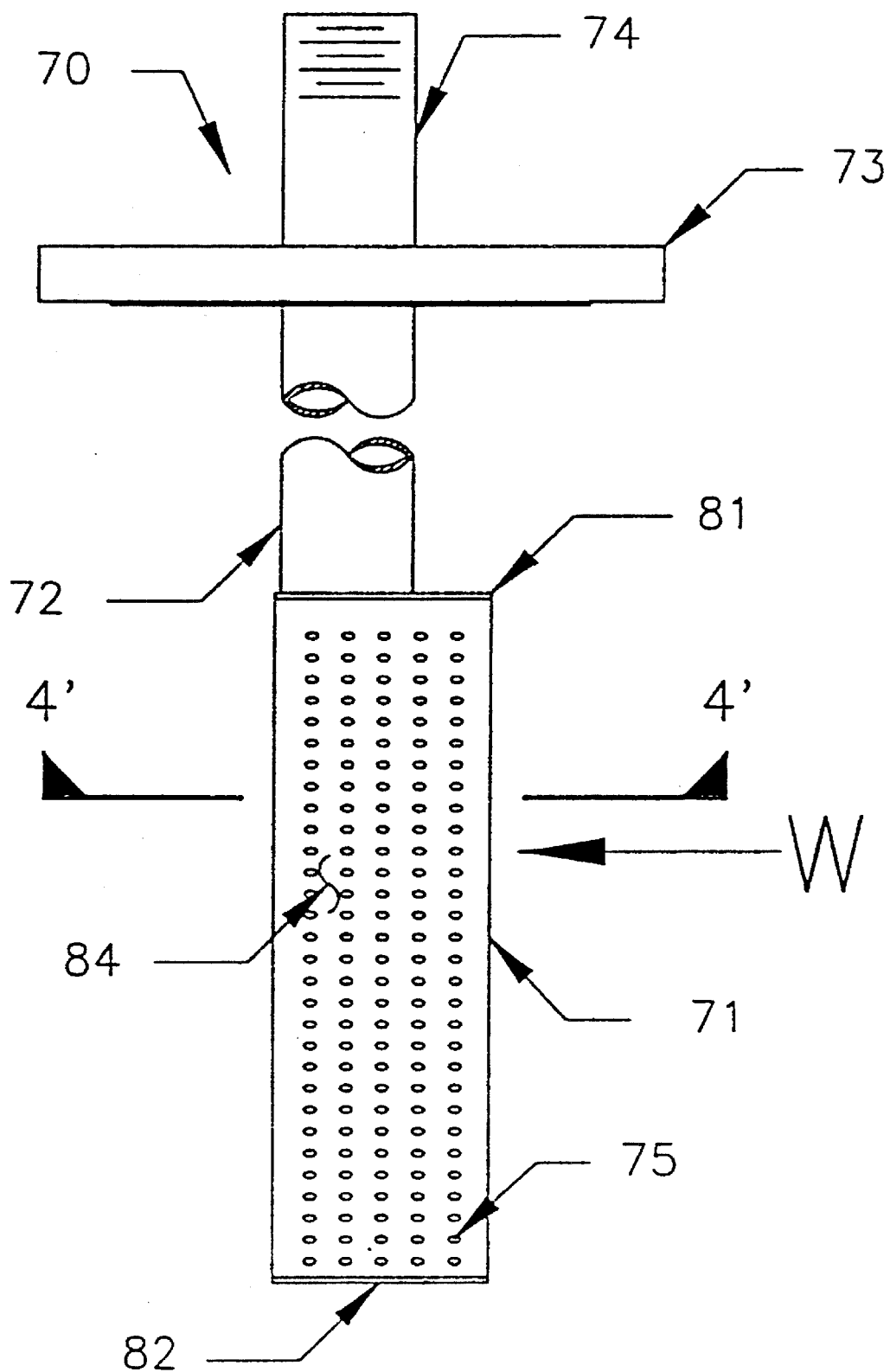
FIG. 3 is a side view of the preferred injector used in the present invention.
Figure 4:
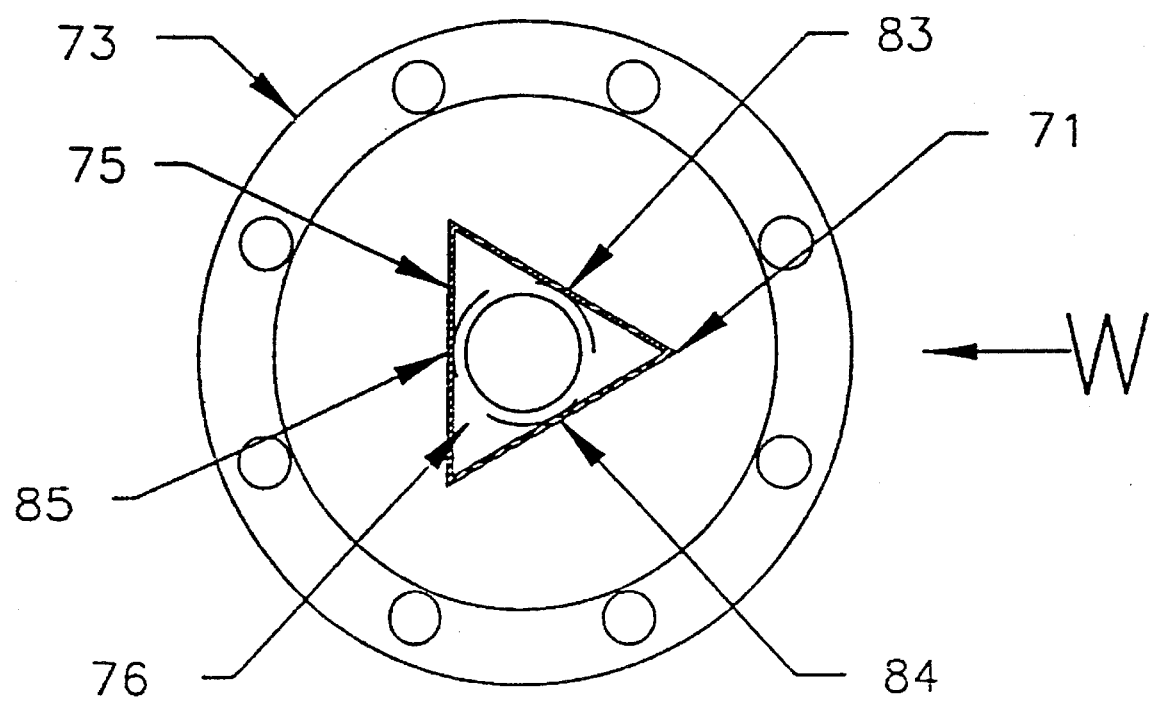
FIG. 4 is a cross-section of the preferred injector shown in FIG. 3, taken along 4'—4'.

Referring now to FIGS. 3 and 4, the diffusion means 70 is shown in more detail. The diffusion means 70 comprises diffuser 71, inlet piping 72, flange 73, and connector pipe 74. Connector pipe 74 attaches to the piping 35 and allows the carrier water-carbon dioxide solution to enter the diffusion means 70. Flange 73 allows the diffusion means 70 to be secured, as necessary, to support means (not shown). Inlet piping 72 provides access to the carrier water-carbon dioxide solution to the diffuser 71.

Diffuser 71 typically is a triangular prismatic structure which is inserted into pipe 36 such that the prism axis, which is roughly parallel to the inlet pipe 72 axis, is normal to the pipe 36 axis, and normal to the direction of flow of the water W to be treated. The carrier water-carbon dioxide solution is injected into the center or interior 76 of diffuser 71. The carrier water-carbon dioxide solution is under higher pressure than the water W to be treated, such that when the carrier water-carbon dioxide solution is injected into the interior 76 of the diffusers 71, the higher pressure of the carrier water-carbon dioxide is maintained within the difuser. The diffuser is designed to maintain system pressure until the solution passes through a plurality of small holes on two rectangular sides, 83, 84. The pressure drop caused by the carrier water-carbon dioxide solution being forced through the plurality of small holes forces excess $CO_2$ gas from the carrier water-carbon dioxide solution. This excess $CO_2$ gas bursts forth as an effervescence mixing with the water to be treated, thus reducing the pH. The velocity of the saturated solution water passing through small diffuser holes, along with the release of excess carbon dioxide gas at the same time, causes tremendous mixing and immediate chemical reaction with the main water stream.

The preferred solution injector is a triangular prismatic diffuser 71 which is inserted normal to the direction of flow of the water stream W. One triangular end 81 of the diffuser connects to an inlet feed line 72 for the solution, while the second triangular end 82 is solid. Two of the three rectangular sides 83, 84 of the diffuser 71 have a plurality of small holes 75 therethrough allowing communication between the interior 76 of the diffuser 71 and the water stream W. The vertex of two sides 83, 84 faces upstream and the third side 85 faces downstream relative to the direction of flow of the water stream W.

The solution, at elevated pressure, is fed to the diffuser 71 through a feed line 35. The pressurized solution, upon encountering the lower pressure water stream W, equilibrates. Carbon dioxide in the mixture thus expands and comes out of the solution as a gas. As the vertex of two sides 83, 84 of the diffuser 71 faces upstream, two sides 83, 84 of the diffuser 71 effectively are in the flow path of the water stream W, allowing greater contact between the carbon dioxide gas and the water stream W. The positioning of the third side 85 of the diffuser 71, facing downstream, creates a vortex in the water stream W flow, thus allowing additional mixing.

The system of the present invention takes carbon dioxide gas at an elevated pressure and injects this gas into a carrier water C, also at an elevated pressure. The amount of carbon dioxide which can be mixed with water at various temperatures and pressures is known. For example, the volume of carbon dioxide which can dissolve in one volume of water is shown in Table I.

TABLE I

VOLUMES OF CARBON DIOXIDE DISSOLVED IN ONE VOLUME OF WATER
Pressure, psig (kPa)

| Temperature °F./°C. | 0 (0) | 20 (138) | 40 (276) | 60 (414) | 90 (621) | 100 (689) |
|---|---|---|---|---|---|---|
| 32/0 | 1.71 | 4.0 | 6.3 | 8.6 | 10.9 | 13.4 |
| 40/4.4 | 1.45 | 3.4 | 5.3 | 7.3 | 9.2 | 11.3 |
| 60/15.6 | 1.00 | 2.3 | 3.7 | 5.0 | 6.3 | 7.8 |
| 80/26.7 | 0.73 | 1.7 | 2.7 | 3.6 | 4.6 | 5.7 |
| 100/37.8 | 0.56 | 1.3 | 2.0 | 2.8 | 3.5 | 4.3 |

Although any ratio of carbon dioxide to carrier water C allowable under the laws of nature is appropriate, it has been found that by using approximately 60 gallons of carrier water C per pound of carbon dioxide gas, a carrier water having a pH of about 5 which contains excess carbon dioxide gas under pressure is created. When this preferred solution is injected into the water W to be treated through the diffuser 71, the excess carbon dioxide gas immediately comes out of solution in the form of minute bubbles. These bubbles are released into the main stream of water W to be treated, and mixes along with the low pH carrier water C with the water to be treated, thus reducing the pH of the water W to be treated.

The solution feed system of the present invention allows accurate control of the pH of water to be treated at a desired level through a process in which the water W to be treated also is stabilized at the desired pH in a very short period of time. Typically, conventional prior art and accepted practice allows for a 20 to 30 minute retention time after adding the carbon dioxide in which the water to be treated stabilizes at the desired pH. In the present system, approximately 95% of the chemical reaction between the water to be treated and the carbon dioxide gas is immediate. Thus, very short retention times on the order of less than 7 minutes, and typically between about 20 seconds and about 30 seconds, are required to adjust the pH and stabilize the water W to be treated using the present system.

In operation, carrier water C at the rate of approximately 60 gallons per minute minimum for every pound of carbon dioxide gas to be used is supplied to the control panel 50. The carrier water C may be clarifier water, raw water, finished water or any reasonably clean water supply available. The carrier water C is pumped up to a minimum of 50 psig. As the high pressure carrier water C is introduced to the control panels 50, carbon dioxide gas is injected into the carrier water C through a fine bubble diffuser 80. The carrier water-carbon dioxide mixture then passes through in-line static mixers 32 for further mixing. After the static mixers 32, the carrier water-carbon dioxide solution passes around a serpentine pipe system 34 which provides additional contact time. The carrier water-carbon dioxide solution then travels through piping 35 for distribution to the diffusion means 70.

The diffuser 71 has its triangular prismatic shape to allow the injection of the carrier water-carbon dioxide solution into the water W to be treated against the flow of the main stream, and to create a vortex around and behind the diffuser 71, that is downstream of the water W to be treated, which helps the carrier water-carbon dioxide solution mix into the main stream of the water W to be treated. The injection of the carrier water-carbon dioxide solution typically occurs anywhere from 3 to 7 minutes before the final filter or effluent of the water W to be treated.

The following Examples illustrate the efficacy of the present system:

EXAMPLE 1

The present system was used to treat a clarifier effluent. The incoming pH of the clarifier effluent was 10.3. The carrier water used was clarifier water, into which carbon dioxide was fed at the rate of 4.5 standard cubic feet per minute per 95 gallons per minute of carrier water, or approximately one-half pound of carbon dioxide per 95 gallons of carrier water. The carbon dioxide-carrier water solution was added at 50 psig to the open pipeline at the clarifier effluent. The depth of the effluent trough was about 5 feet. There was about 4 minutes detention time in the open pipeline before the treated water arrived at the filters. 1.2 millions gallons of water were treated. The pH of the clarifier effluent treated with the carbon dioxide-carrier water solution averaged 8.4. The theoretical carbon dioxide requirement for this amount of water was 304 pounds per million gallons using an 85% efficiency rate. Only 275 total pounds of carbon dioxide were used during this test, resulting in a carbon dioxide requirement of about 230 pounds per million gallons. The stability of the treated water was very good.

EXAMPLE 2

The present system was used to treat a stream of waste water. The waste water flow rate was between 200 to 500 gallons per minute. The incoming pH of the waste water was 10.5. 1 pound of carbon dioxide per 95 gallons of carrier water was needed to maintain a final pH of 8.8 in the treated water.

EXAMPLE 3

The present system was used to treat a combination effluent. The major component of the effluent was a mill effluent of 16 million gallons per day having a pH of 10.8. A bleach plant effluent of 8.5 million gallons per day was added to the mill effluent in a mixing chamber which, at times, brings the pH of the effluent mixture down to about 9.5. The effluent temperature was 115° F. in the summer and 105° F. in the winter. 5.0 standard cubic feet (about 0.55 pounds) of carbon dioxide in 90 gallons of carrier water was able to maintain the pH of the treated effluent stream. Retention time was approximately 3 minutes.

EXAMPLE 4

The present system was used to treat the influent to a plant. It was desired to reduce the pH of the influent water from 7.3 to a pH of 5.9 to 6.0. The influent flow rate was approximately 3.9 million gallons per day. Theoretical calculations indicated that 650 pounds of carbon dioxide per million gallons of influent were needed to accomplish this pH. A carbon dioxide-carrier water solution containing 1.5 pounds of carbon dioxide per 95 gallons of water was supplied to the influent at 60 psig, and was able to maintain the desired pH. The retention time of the pipe after the injection of the carbon dioxide-carrier water solution was approximately 10 seconds.

The above detailed description of a preferred embodiment and examples are for illustrative purposes only and are not intended to limit the scope and spirit of the invention or its equivalents as defined in the following claims.

What is Claimed:

1. A continuous-flow method for introducing a pressurized solution feed into a liquid stream flowing through a pipe for controlling the pH of the liquid stream, comprising the steps of:

a. providing a gas comprising carbon dioxide at a first pressure between about 30 and 300 psig;

b. providing a first liquid comprising water at a second pressure which is a minimum of 50 psig;

c. mixing said gas with said first liquid to form a supersaturated carbon dioxide-water solution at a third pressure and having a first pH;

d. providing said liquid stream comprising a second liquid at a pressure less than said first, second and third pressures and having a second pH greater than said first pH;

e. maintaining said solution at said third pressure until introduced into said liquid stream; and f. introducing said solution continuously into said liquid stream, releasing excess carbon dioxide from said solution into said liquid stream, to reduce the pH of said liquid stream.

2. The method as claimed in claim 1, wherein said first pressure is between about 75 psig and 150 psig and said second pressure is greater than about 50 psig.

3. A continuous-flow method for controlling the pH of a water stream flowing through a pipe, comprising the steps of:

a. providing a first quantity of a gas comprising carbon dioxide at a first pressure between about 30 and 300 psig;

b. providing a second quantity of a carrier liquid comprising water at a second pressure which is a minimum of 50 psig;

c. mixing said gas with said carder liquid to form a supersaturated carbon dioxide-water solution at a third pressure and having a first pH lower than the pH of said water stream;

d. maintaining said solution at said third pressure until introduced into said water stream; and e. introducing said solution continuously into said water stream, thus reducing the pH of said water stream by adjusting said first quantity and said second quantity.

4. The method as claimed in claim 3, wherein said first quantity is between about 0.1 pound per unit of time and about 10 pounds per unit of time of carbon dioxide, and said second quantity is between about 5.0 gallons per unit of time and about 120 gallons per unit of time of carrier liquid.

5. The method as claimed in claim 4, wherein said first quantity is between about 0.5 pounds per unit of time and 5 pounds per unit of time of carbon dioxide, and said second quantity is between about 30 gallons per unit of time and about 90 gallons per unit of time of carrier liquid.

6. The method as claimed in claim 3, wherein the ratio of said first quantity to said second quantity is from about 0.5 to about 2.0 pounds per unit of time to about 40 to about 80 gallons per unit of time.

7. The method as claimed in claim 6, wherein said ratio is about 1.0 pound per unit of time to about 60 gallons per unit of time.

* * * * *